(12) United States Patent
Nishimura et al.

(10) Patent No.: US 6,282,361 B1
(45) Date of Patent: Aug. 28, 2001

(54) MULTI-CHANNEL VARIABLE OPTICAL ATTENUATOR

(75) Inventors: Masayuki Nishimura; Koji Nakazato, both of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/459,873

(22) Filed: Dec. 14, 1999

(30) Foreign Application Priority Data

Dec. 15, 1998 (JP) .................................................. 10-356113

(51) Int. Cl.$^7$ ............................... G02B 6/00; G02F 1/035
(52) U.S. Cl. ................................. 385/140; 385/5; 385/10; 385/37
(58) Field of Search ................... 385/1–3, 5, 10, 385/37, 140

(56) References Cited

U.S. PATENT DOCUMENTS

| | | | |
|---|---|---|---|
| 5,812,710 | * | 9/1998 | Sugaya .................................. 385/27 |
| 5,881,199 | * | 3/1999 | Li ......................................... 385/140 |
| 5,923,450 | * | 7/1999 | Dugan et al. ......................... 359/127 |
| 5,982,960 | * | 11/1999 | Akiba et al. ........................... 385/24 |
| 6,208,441 | * | 3/2001 | Jones et al. ........................... 359/127 |

OTHER PUBLICATIONS

"Power Control in ADM Node Using High–Speed, Compact–Size Optical Spectrum Monitor", by Otsuka et al., Electronics Society Conference of IEICE, 1997, B–10–101 (with English translation).

"Magneto Optical Variable Optical Attenuator", by Nakada et al., Electronics Society Conference of IEICE, 1997, C–3–48 (with English translation).

"Variable Optical Attenuator Based on PLC Technology for Gain Control in WDM Linear–Repeater", by Kawai et al., Electronics Society Conference of IEICE, 1997, B–10–61(with English translation).

* cited by examiner

*Primary Examiner*—John D. Lee
*Assistant Examiner*—Jennifer Doan
(74) *Attorney, Agent, or Firm*—McDermott, Will & Emery

(57) ABSTRACT

The present invention is to provide a multi-channel variable optical attenuator with a small size and a simple control circuitry, which requires a short time for adjusting the attenuation level of signal lights. The optical attenuator comprises an optical attenuating portion 10, a control circuitry 20 and a master control circuitry 21. The optical attenuating portion includes a plurality of optical waveguides $12_1$–$12_N$ and a plurality of attenuation adjusting portions $13_1$–$13_N$, both of which is formed in a substrate 11. A signal light of a specific wavelength $\lambda_i$, which is derived from the wavelength multiplexed light, transmits in a respective waveguide $12_i$ and is attenuated by a specific amount at the attenuation adjusting portion $13_i$. The control circuitry 20 outputs a plurality of control signals $14_1$–$14_N$ to attenuation adjusting portions $13_1$–$13_N$ so that the attenuation in each optical waveguides $12_1$–$12_N$ is varied by the specific amount to the master control 22 sent from the master control circuitry 21. Thus, optical output levels from waveguides $12_1$–$12_N$ are equalized.

8 Claims, 8 Drawing Sheets

MULTI-CHANNEL VARIABLE OPTICAL ATTENUATOR

BACKGROUND OF THE INVENTION

1. Field of Invention

The present invention relates to a multi-channel variable optical attenuator suitable for the wavelength division multiplexing (WDM) system.

2. Description of Related Prior Art

In the WDM system, optical communications can be made in a large capacity and at a high speed by transmitting wavelength multiplexed light comprising a plurality of signal lights each having a different wavelength in a 1.55um band through an optical fiber accompanied by an optical amplifier. Even if each of signal lights output from a transmitting station is of the same optical level, their optical levels at the receiving station may be varied due to the gain slope of the optical amplifier or the transmission characteristics of the optical fiber. The variation among the optical levels of the signal lights causes an erroneous transmission. Accordingly, it is desirable that the optical levels of respective signal lights should be equalized.

Otsuka et al. has presented an optical de-mulitplexer and an variable optical attenuator which is individually provided for each of de-multiplexed signal lights in the Electronics Society Conference of IEICE (the Institute of Electronics, Information and Communication Engineers) 1997, B-10-101. In this optical attenuator, the attenuation amount of respective signal lights is controlled based on both of the incoming and the outgoing wavelength multiplexed light.

Nakata et al. has presented a variable optical attenuator comprising two polarizing plates, a Faraday rotator, a permanent magnet and an electromagnet in the same Conference of IEICE 1997 C-3-48. In this attenuator, the attenuation amount depends on the Faraday rotation angle controlled by the magnetic field. To use this attenuator in the WDM system and to equalize the optical levels of the signal lights, the same number of the attenuator as that of the signal lights are necessary.

Kawai et al. has presented in the same Conference 1997 B-10-61 that a variable optical attenuator provided with a Mach-Zender interferometer and a heating device to heat up one of paired waveguides of the Mach-Zender interferometer. In this attenuator, the attenuation is performed by varying the phase of the light transmitting in the heated waveguide. To use this type of attenuator in the WDM system, a plurality of attenuators are necessary, too.

In the conventional examples mentioned above, the same number of monitoring devices as that of the signal lights are needed to equalize the optical levels of respective signal lights because the individual attenuator is controlled by the corresponding monitoring device. Consequently, the volume of the equipment, which contains the multi-channel attenuator, will be large and the additive control circuitry will be complicated. Moreover, it will take a long time to equalize the optical levels of respective signal lights when such levels are varied signal to signal or fluctuate.

SUMMARY OF THE INVENTION

The object of the present invention is to provide a multi-channel variable optical attenuator having a compact size and a simple structure, solving the above problems.

The multi-channel variable optical attenuator of the present invention is for wavelength multiplexed light which contains a plurality of signal lights and each of signal lights has a specific wavelength different from that of other signal lights. The multi-channel attenuator comprises a master control circuitry, a plurality of optical waveguides, a plurality of attenuation adjusting portions, and a control circuitry. The master control circuitry detects the optical levels of the wavelength multiplexed light and outputs a master control signal derived from the detected levels. The signal lights each having a different wavelength propagate through the corresponding waveguides. The attenuation adjusting portion, which is provided in the waveguide, attenuates the signal lights. The control circuitry, based on the master control signal output from the master control circuitry, controls the attenuation amount of the respective signal lights by a rate specific to the respective adjusting portions.

The optical attenuating portion may include a Mach-Zender interferometer that has a pair of optical waveguides and at least one of the paired optical waveguides is provided with a phase adjusting portion for varying a phase of light propagating therethrough.

It is favorable that the Mach-Zender interferometers provided in the respective waveguides have different configurations, and the control signal output from the control circuitry is single and commonly applied to the Mach-Zender interferometers so as to attenuate respective signal lights by the specific rate.

It is also possible that the Mach-Zender interferometers provided have the same configuration, and the control signal output from the control circuitry is different to respective phase adjusting portions so as to attenuate respective signal lights by the specific rate.

The phase adjusting portion may include a temperature varying device and the phase of light propagating through one of the paired waveguide where the temperature varying device is formed, is varied by temperature.

Further, the multi-channel variable optical attenuator of the present invention may contain an arrayed waveguide grating (AWG) de-multiplexer in a front side section. The wavelength multiplexed light is de-multiplexed in the AWG and the signal lights each having a different wavelength are conducted to the attenuator and attenuated by the amount specific to respective signal lights so as to equalize the optical level of respective signal lights.

The multi-channel variable optical attenuator of the present invention may contain the AWG multiplexer in the rear section. The signal lights are inputted to the AWG multiplexer, multiplexed in the AWG and the wavelength multiplexed light is output.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF PREFERRED EMBODIMENTS

Description of the embodiment

Detailed description of the present invention will be described referring to the accompanying drawings. Constituents identical to each other or those having functions identical will be referred to with numerals or letters identical to each other without repeating their overlapping explanations.

First embodiment

Figure 1:
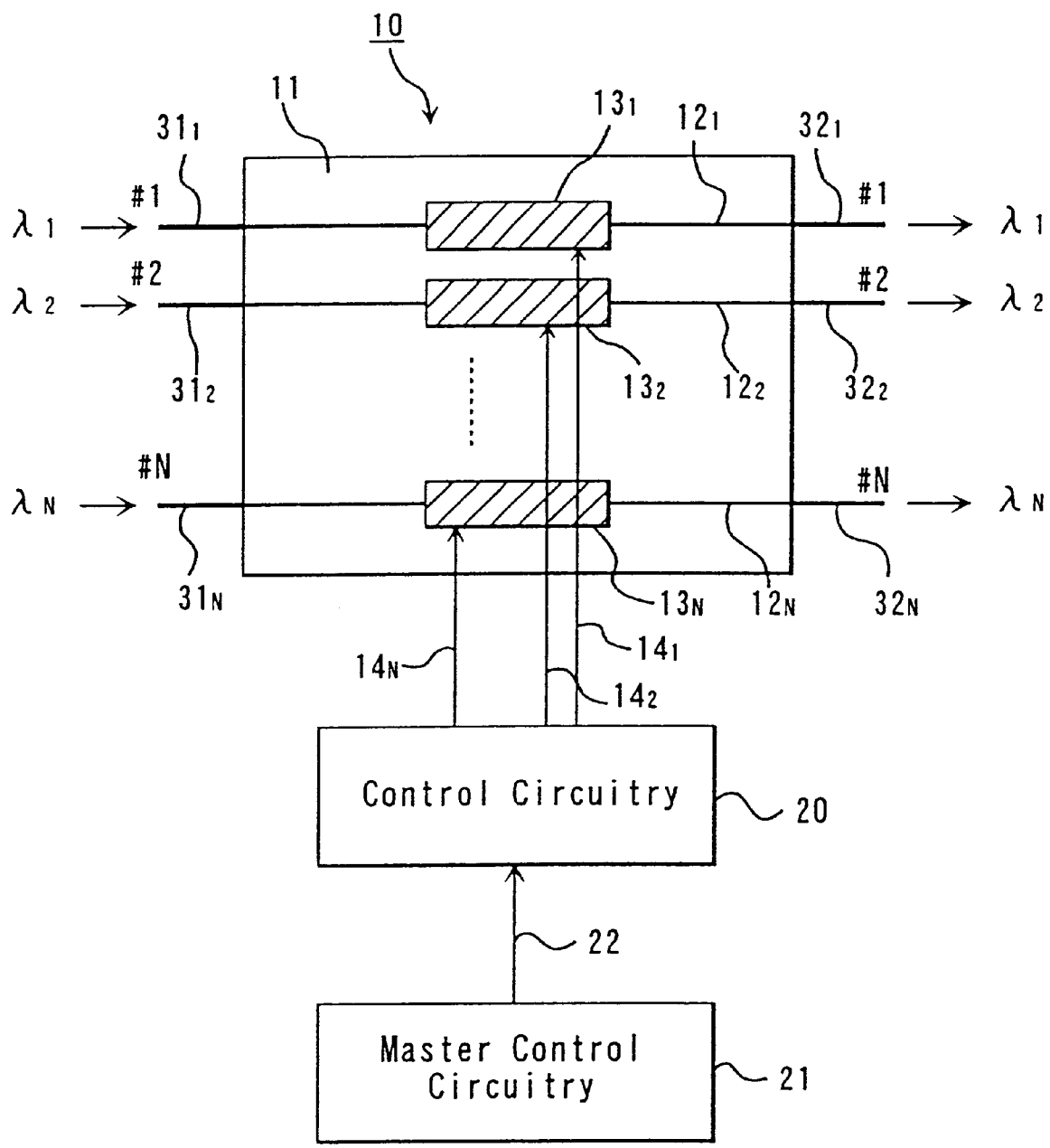
FIG. 1 is a schematic diagram of the multi-channel variable optical attenuator of the present invention.

FIG. 1 shows a block diagram of a multi-channel optical attenuator of the present invention. The optical attenuator comprises an optical attenuating portion 10, a control circuitry 20 and a master control circuitry 21. The optical attenuating portion includes a plurality of optical waveguides $12_1$–$12_N$ and a plurality of attenuation adjusting portions $13_1$–$13_N$, both of which are formed in a substrate 11 made of $SiO_2$, for example. A signal light of a specific wavelength $\lambda_i$, which is derived from the wavelength multiplexed light, propagates through a respective waveguide $12_i$ and is attenuated by a specific amount at the attenuation adjusting portion $13_i$.

The control circuitry 20 outputs a plurality of control signals $14_1$–$14_N$ to attenuation adjusting portions $13_1$–$14_N$ such that the attenuation in respective optical waveguides $12_1$–$12_N$ is varied by the specific amount based on the master control signal 22 sent from the master control circuitry 21, thereby equalizing optical output levels from waveguides $12_1$–$12_N$.

Figure 2:
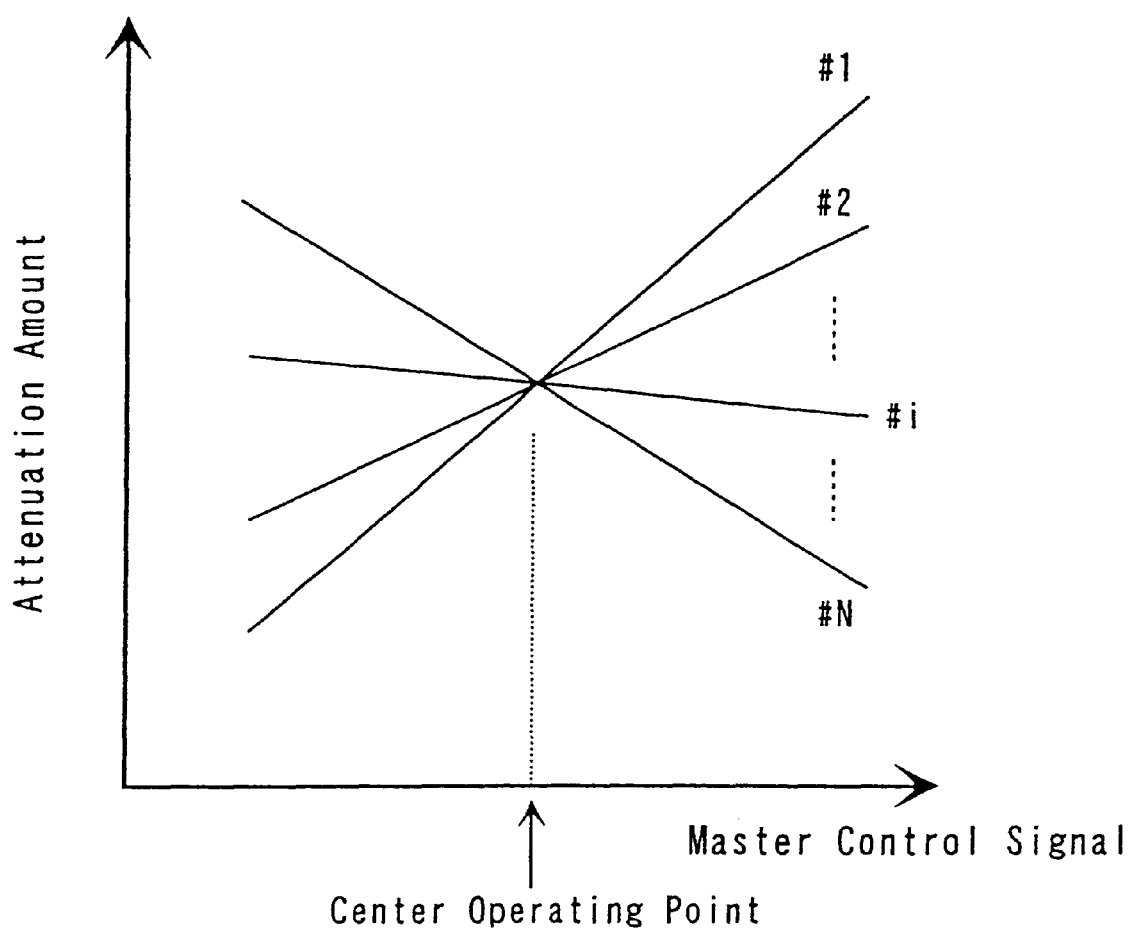
FIG. 2 is a diagram showing the behavior of the multi-channel variable optical attenuator.

The operation of the multi-channel optical attenuator of the present invention is shown in FIG. 2. The figure shows the relation between the master control signal 22 inputted to the control circuitry 20 and the attenuation amount of respective signal lights propagating through the corresponding optical waveguides $12_1$–$12_N$. As shown in the figure, the attenuation amount of the signal light $\lambda_i$, which propagates through the waveguide $12_i$, is varied by the control circuitry 20 based on the master control signal 22.

The attenuation amounts of respective signal lights are almost equal when the master control signal 22 is in the center of its operation range, and vary at a specific rate as the master control signal varies. That is, sending the master control signal 22 larger than the center value of the operation range to the control circuitry 20, the attenuation amount is the largest for the signal light of wavelength $\lambda_1$ and is smaller in $\lambda_2, \ldots, \lambda_N$ in this order. In the case that the master control signal 22 is smaller than the center value, the attenuation amount is the smallest for the signal light of wavelength $\lambda_1$ and becomes larger in $\lambda_2, \ldots, \lambda_N$ in this order. Moreover, as the master control signal 22 is the more apart from the center value, the difference of the attenuation amount of respective signal lights becomes the larger.

Figure 3:
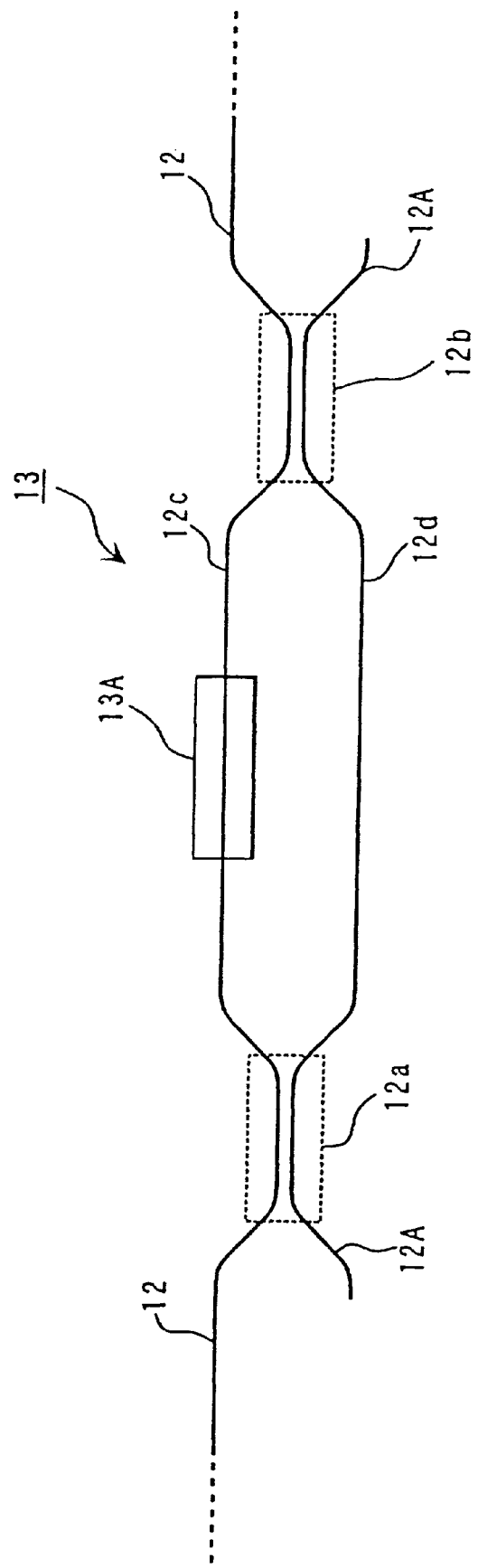
FIG. 3 is a block diagram of the attenuation adjusting portion in the multi-channel attenuator.

FIG. 3 shows the block diagram of the attenuation adjusting portion $13_i$ in the optical attenuating portion 10. A Mach-Zender interferometer 13 is provided with the attenuation adjusting portion. The optical waveguide 12 and its pairing waveguide 12A comprise two optical directional couplers 12a, 12b. Two directional couplers (12a, 12b) and two optical paths (12c, 12d) between the couplers (12a, 12b) comprise the Mach-Zender interferometer 13. Optical path 12c is provided with the phase adjusting portion 13A. Heating or cooling the phase adjusting portion 13A varies the difference of the optical path length between two optical paths (12c, 12d). Electrical heater or Peltier element, for example, is employed as a heating or a cooling device for temperature modulation of the phase adjusting portion. Another example for the phase adjusting portion 13A is two electrodes provided in such a manner as to insert the optical path 12c therebetween, so as to operate as an electric field applying device. The control circuitry 20 in FIG. 1 sends one of the control signals $14_1$–$14_N$ to the phase adjusting portion 13A.

The signal light directed in the waveguide 12 is divided into two lights at the directional coupler 12a. One of the lights divided by the coupler 12a transmits in the path 12c and the other light transmits in the path 12d. Both lights are combined again at the second coupler 12d. The phase of the light in the path 12c is varied at the phase adjusting portion 13A during the transmission. The combined light outgoing from the waveguide 12 reflects the phase difference of the two lights. When the phase difference of two lights is 180°, the amplitude of the two lights are completely compensated each other and no optical power generates. If the phase difference is 0°, then the optical power becomes the maximum.

Figure 4:
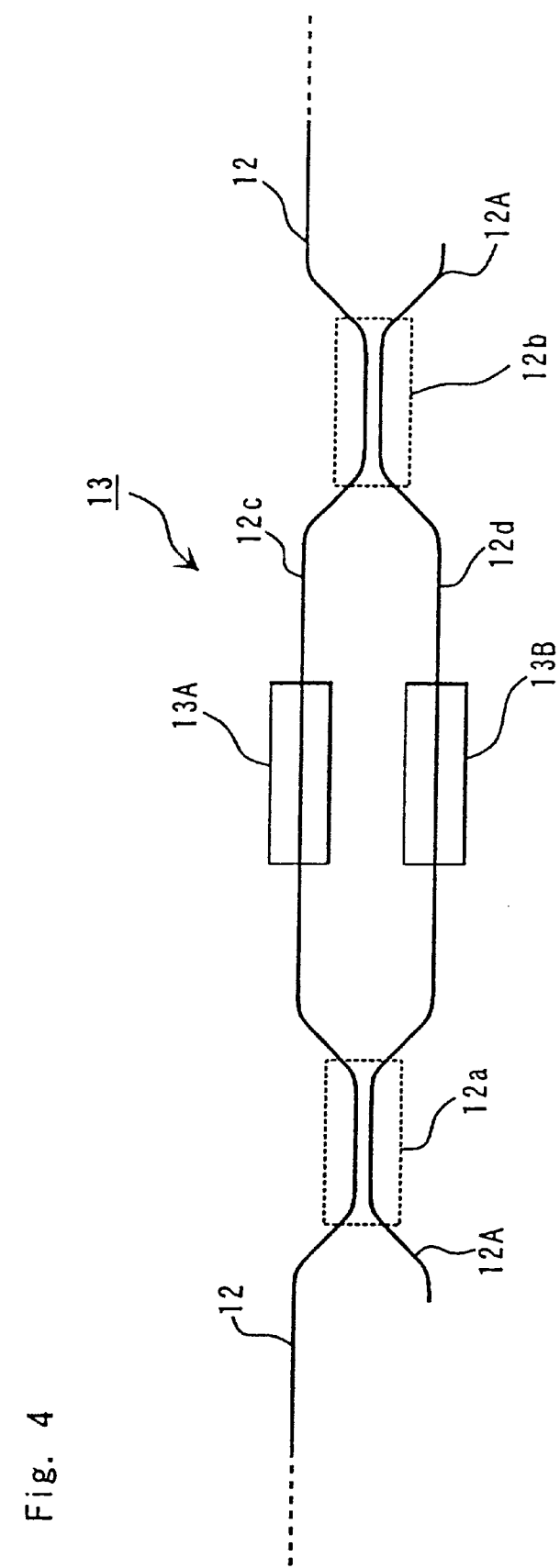
FIG. 4 is a block diagram of another attenuation adjusting portion of the multi-channel attenuator.

FIG. 4 shows another example of the attenuation adjusting portion 13. In this example, the second phase adjusting portion 13B is provided in the optical path 12d. The first phase adjusting portion 13A varies the phase of light transmitting in the optical path 12c, while the second phase adjusting portion varies the phase of the light in the optical path 12d. Both phase adjusting portions include, for example, temperature controlling device such as an electrical heater or a Peltier element, or an electric field applying device such as two electrodes. In the case of the temperature controlling device, it is favorable to warm up one of the phase adjusting portions and to cool down the other phase adjusting portion. The phase adjusting signal $14_i$ in FIG. 1 is applied to both adjusting portions.

In the present example the mechanism that the optical power of the light combined by the second directional coupler 12b depends on the phase difference of two lights in optical paths (12c, 12d) is the same with that in the embodiment previously mentioned. However, the present example shows more effective results because the phase adjusting is performed oppositely in these optical paths, that is, the phase advancing in one of the optical paths while the phase delaying in the other optical path.

In the embodiments shown in FIG. 3 and FIG. 4, the following configuration for the phase adjusting portion is desirable to realize the attenuation characteristic shown in FIG. 2, in which the attenuation amount of respective signal lights vary individually by a given specific rate based on the master control signal 22. The Mach-Zender interferometers, or the configurations of the phase adjusting portions 13A, 13B provided therein, are different from each other in optical waveguides $12_1$–$12_N$. Therefore, even if only one type of control signal is commonly applied to respective attenuation adjusting portions $13_1$–$13_N$ or each phase adjusting portion 13A in respective Mach-Zender interferometers, the attenuation amounts of respective signal lights becomes different to each other.

Such different attenuation amounts of respective signal lights can be obtained by adjusting the length or width of the two optical paths 12c and 12d, or to change the coupling efficiency of the two directional couplers 13A and 13B by adjusting the gap between the two optical paths and the coupling length of the two paths.

It is also favorable to send control signals $14_1$–$14_N$, which are different to each other according to the wavelength of the signal lights, to the phase adjusting portions 13A, 13B of respective waveguides $12_1$–$12_N$. In this case, the same configuration can be employed for respective phase adjusting portions or Mach-Zender interferometers.

Figure 5:
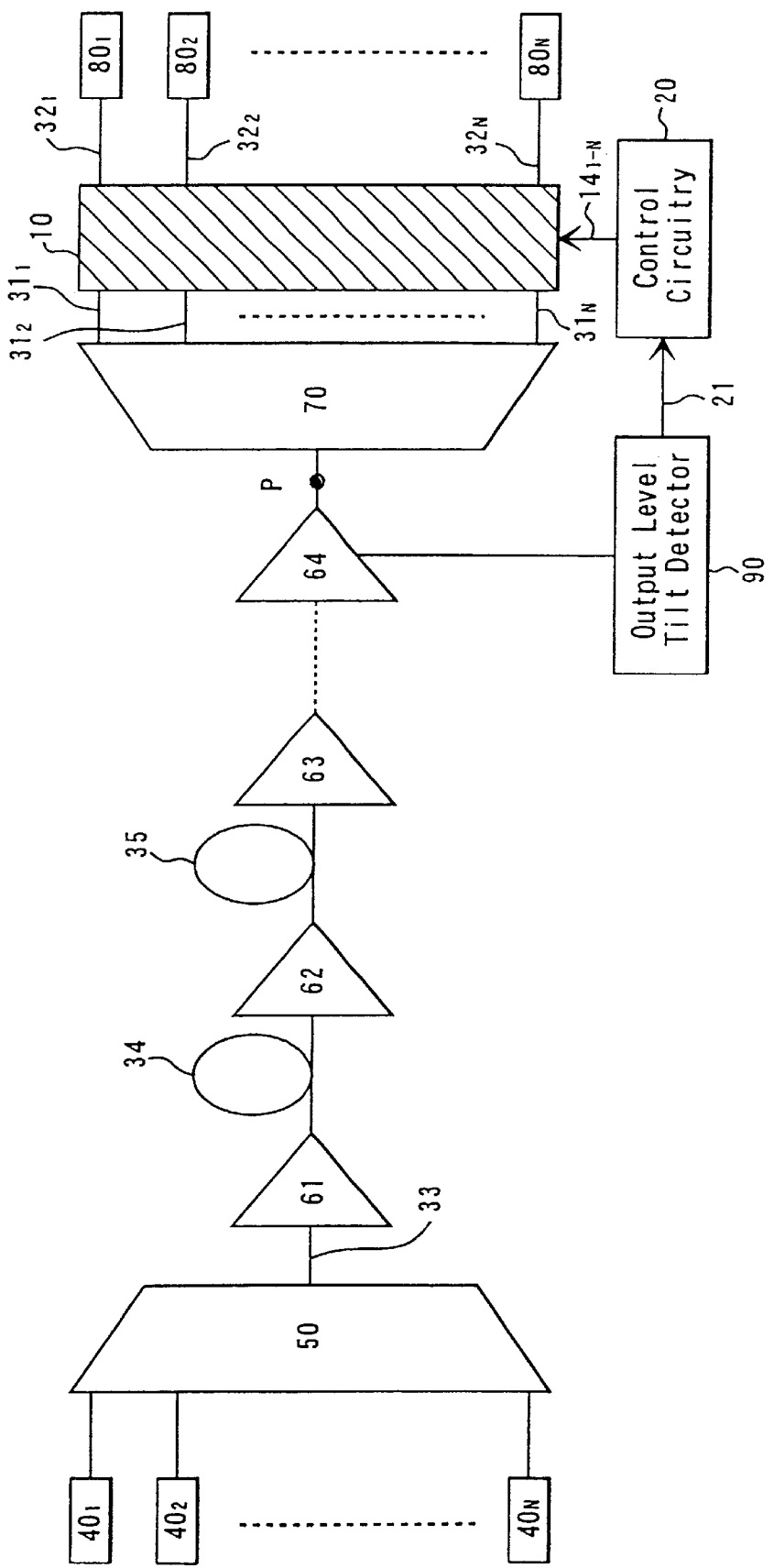
FIG. 5 is a block diagram of the optical transmission system using the multi-channel variable optical attenuator of the present invention.

FIG. 5 shows the optical transmission system employing the multi-channel variable optical attenuator of the present invention. In this system, the transmitting station 55 comprises a plurality of optical transmitters $40_1$–$40_N$, an optical multiplexer 50, and an optical amplifier 61. While the receiving station 56 provides with an optical amplifier 64, an optical de-multiplexer 70, a multi-channel optical attenuating portion 10, a plurality of optical receivers $80_1$–$80_N$, an output level tilt detector 90, and the control circuitry 20.

The optical transmitter $40_i$ outputs a signal light of wavelength $\lambda_i$ and the optical multiplexer multiplexes signal lights of wavelengths $\lambda_1$–$\lambda_N$ emitted from respective optical transmitters $40_1$–$40_N$. The optical amplifier 61 amplifies the wavelength multiplexed light. The light multiplexed by the multiplexer 50 and amplified by the optical amplifier 61 is transmitted in a transmission optical fiber 34, amplified again by the optical amplifier 62, transmitted in the fiber 35, amplified by the amplifier 63, and finally reaches to the optical amplifier 64 in the receiving station 56.

The optical amplifier 64 amplifies the wavelength multiplexed light under the condition of maintaining the output level to be constant, for example. The optical de-multiplexer divides the wavelength multiplexed light to a plurality of signal lights, each of which has its own specific one of the wavelengths $\lambda_1$–$\lambda_N$ and outputs the de-multiplexed signal lights to the fibers $31_1$–$31_N$, respectively. The multi-channel optical attenuating portion 10, the configuration of which is the same with that mentioned in FIG. 1, equalizes the output level of all signal lights by individually attenuating as much as its specific amount. The optical receiver $80_i$ receives the signal light of wavelength $\lambda_i$ transmitted through the fiber $32_i$.

The output level tilt detector 90 detects the wavelength dependence of the optical level of the wavelength multiplexed light amplified by the optical amplifier 64, which is defined as "output level tilt". It is simple and favorable to monitor the output level only of the signal light of the maximum wavelength and that of the minimum wavelength among the signal lights. The output level tilt detector 90 outputs the master control signal 22 resulting on the detected output level tilt, that is, the detector 90 corresponds to the master control circuitry 21 in FIG. 1. The control circuitry 20 outputs, based on the master control 22, a plurality of phase adjusting signals to respective phase adjusting portions 13A, 13B in the attenuation adjusting portions $13_1$–$13_N$.

FIG. 6 describes the behavior of the multi-channel variable optical attenuator shown in FIG. 5. FIGS. 6(a) and 6(b) show the output spectrum at the output port P of the optical amplifier output. FIG. 6(a) shows a plane characteristic while FIG. 6(b) involves the output level tilt. In the figures, the continuous ASE (Amplified Spontaneous Emission) component is observed in addition to the discrete component of signal lights. FIGS. 6(c) and 6(d) show the attenuation amount in the multi-channel optical attenuating portion 10, and these figures correspond to the case of FIG. 6(a) and FIG. 6(b), respectively.

Figure 6A:
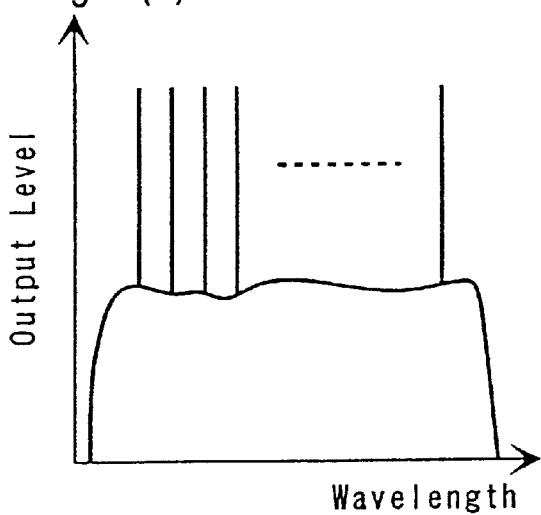
FIGS. 6(a), 6(b), 6(c) and 6(d) is a diagram showing the operation of the multi-channel attenuator.
Figure 6B:
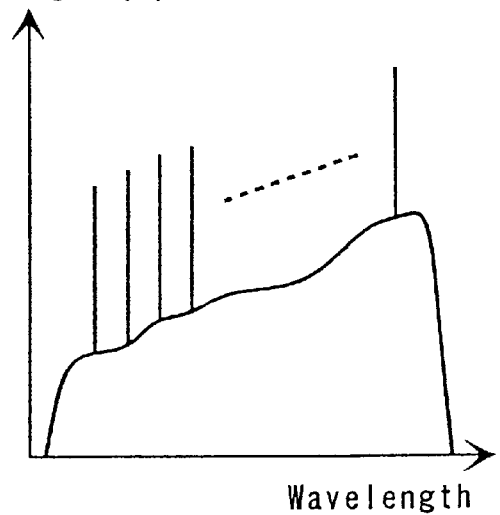
Figure 6C:
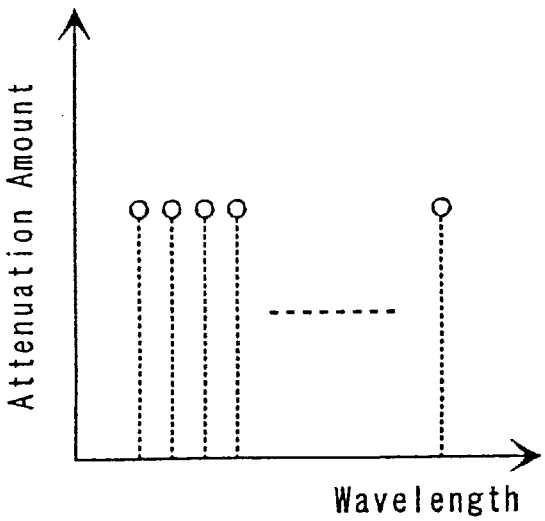

In the case of FIG. 6(a), the output tilt detector 90 detects the equalized output of the optical amplifier 36 and sends the master control signal 22 accordingly. The control circuitry 20 sets the attenuation amounts to be nearly equal as shown in FIG. 6(c). On the other hand, when the output tilt detector 90 detects the output of the optical amplifier 36 to be dependent on the wavelength, that is, the output of the amplifier becomes larger in a longer wavelength, as shown in FIG. 6(b), then the output tilt detector 90 accordingly sends the master control signal 22 to the control circuitry 20.

Figure 6D:
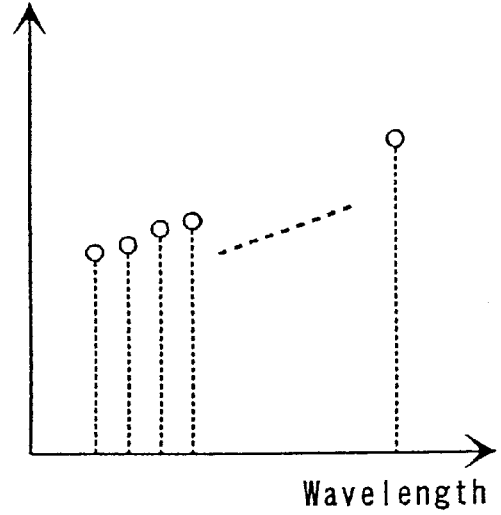

The control circuitry 20 sets the attenuation amount to be larger at a waveguide where the signal light with longer wavelength propagates, as shown in FIG. 6(d). When the optical amplifier output 36 shows a larger value in a shorter wavelength, the control circuitry 20 sets the attenuation amount to be larger in the waveguide where the signal light with shorter wavelength propagates.

According to the present multi-channel variable optical attenuator, even if the output level tilt occurs in the wavelength multiplexed light due to the transmission characteristic of the optical fiber or the gain slope of the optical amplifier inserted into the transmission line, the output can be compensated, by the simple configuration and the prompt control, so as to equalize the optical level of all signal lights.

Even if the output level tilt of the wavelength multiplexed light fluctuates, it is able to compensate promptly. Moreover, a compact multi-channel optical attenuator can be obtained because the optical waveguides $12_1$–$12_N$ and the attenuation adjusting portions $13_1$–$13_N$ are formed integrally on the substrate 11.

Figure 7:
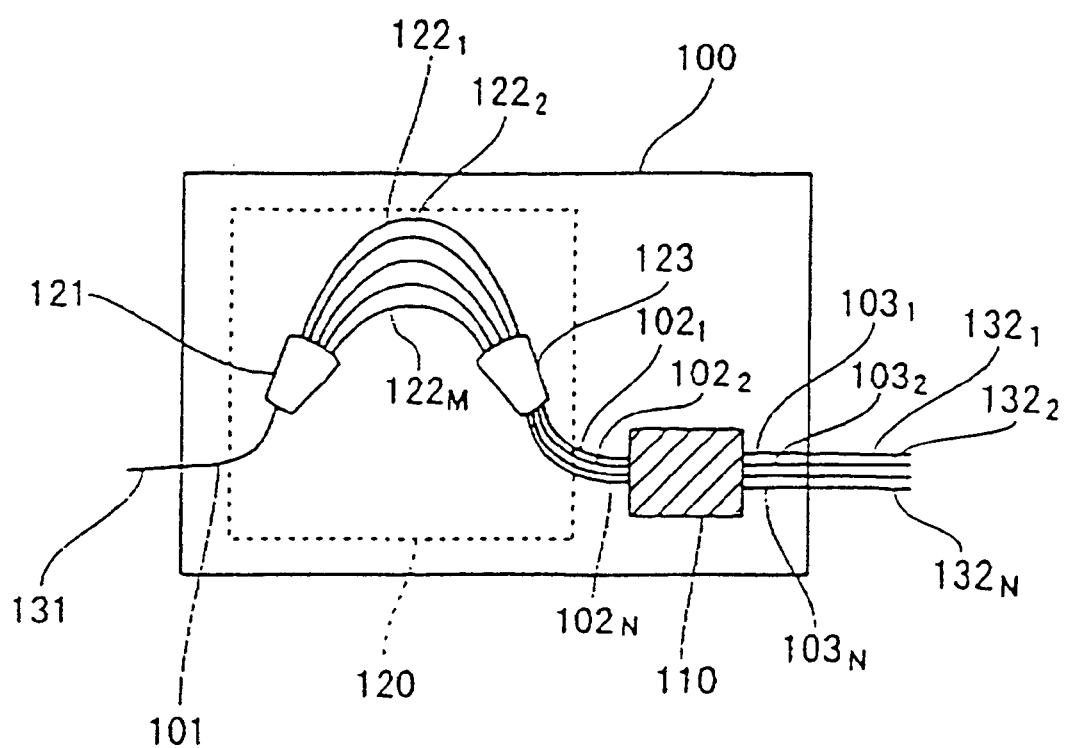
FIG. 7 is a schematic diagram of the multi-channel attenuator of the second embodiment.

FIG. 7 shows the schematic structure of the multi-channel optical attenuator of another embodiment. In FIG. 7, electrical circuits such as the control circuitry 20 in FIG. 1 are not shown. In this embodiment, the optical attenuator 110 and an AWG (Arrayed Waveguide Grating) 120 are formed on the substrate 100 made of $SiO_2$, for example. A plurality of optical waveguides 101, 102, and $103_1$–$103_N$ also formed on the substrate 100.

The AWG 120 comprises a first slab 121, a plurality of optical waveguides $122_1$–$122_N$ and a second slab 123. Slabs 121, 123 can confine a light in a direction perpendicular to the surface of the substrate, while they do not confine the light in a direction parallel to the substrate. The difference in the optical path length of waveguides $122_1$–$122_N$ is kept constant. In FIG. 7, the optical path length of the waveguide $122_1$ is the longest and that of the waveguide $122_N$ is the shortest.

The incident light from the waveguide 101 is distributed equally to respective waveguides $122_1$–$122_N$ in the slab 121 because the slab 121 do not confine the light in the direction parallel to the substrate. Each of distributed lights in the waveguides $121_1$–$121_N$ is caused the phase difference corresponding to the difference of respective optical path lengths during the propagation. At the second slab 123, the light emitted from waveguides $121_1$–$121_N$, may interfere each other and are de-multiplexed to the waveguides $102_1$–$102_N$ with a specific wavelength. Thus, the signal light of wavelength $\lambda_i$ is transmitted in the waveguide $102_i$. This AWG works as the optical de-multiplexer.

The multi-channel optical attenuator 110 is the same with the attenuator shown in FIG. 1. In the attenuator 110, the signal light of wavelength $\lambda_i$ transmitted in the waveguide $102_i$ is attenuated by its specific amount different to respective waveguides and transmitted to the waveguide $103_i$. The output levels of respective signal lights transmitted in the waveguides $103_1$–$103_N$ are equalized.

Thus, the multi-channel optical attenuator with a compact size is obtained by forming the AWG optical de-multiplexer and the optical attenuator in the common substrate. The attenuator integrated with the AWG de-multiplexer are replaced with the optical de-multiplexer 70, optical fibers $31_1$–$31_N$, and the optical attenuator 10 in the system shown in FIG. 5.

Figure 8:
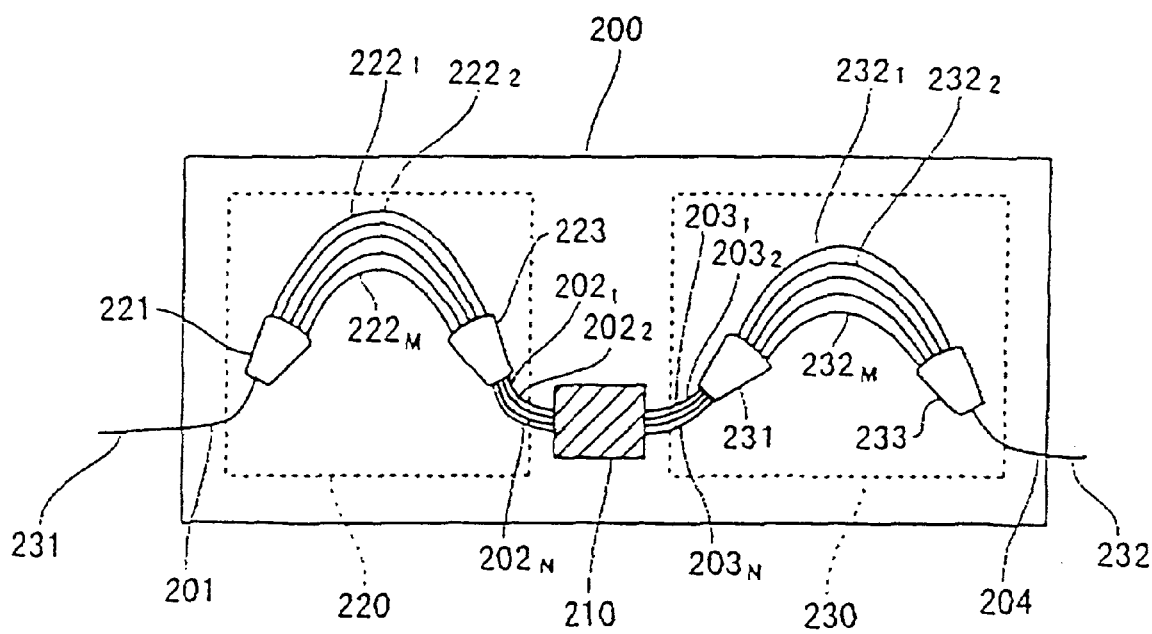
FIG. 8 is a schematic diagram of the multi-channel attenuator of third embodiment.

FIG. 8 shows another schematic diagram of the multi-channel optical attenuator of the present invention. In FIG. 8, the control circuitry is not shown. The present embodiment involves an optical attenuator 210, an AWG de-multiplexer 220 and an AWG multiplexer 230 which are formed in the substrate 200 made of $SiO_2$, for example. The optical waveguides 201, $202_1$–$202_N$, $203_1$–$203_N$ and 204 are also provided in the substrate. The AWG de-multiplexer 220 is the same as that shown in FIG. 7 and comprises a first slab 221, optical waveguides $222_1$–$222_N$, and a second slab 223. The AWG de-multiplexer 220 distributes the incident wavelength multiplexed light from the waveguide 201 to the waveguides $202_1$–$202_N$ with the corresponding specific wavelengths $\lambda_1$–$\lambda_N$.

The configuration of the optical attenuator 210 is the same as the attenuator 110 shown in FIG. 7 or that of FIG. 1. In the attenuator, the signal light of wavelength $\lambda_1$ transmitted from the waveguide $202_i$ is attenuated by the specific amount to the signal wavelength. Thus, the output levels of all signal lights are substantially equalized.

The AWG multiplexer 230 comprises a first slab 231, optical waveguides $232_1$–$232_N$, and a second slab 233. The function of the AWG multiplexer 230 is opposite to the AWG de-multiplexer 220. A plurality of signal lights, each having different wavelengths and transmitting respective waveguides, is merged in the first slab 231, given the phase difference corresponding to each path length in the waveguides $232_1$–$232_N$, interfered in the second slab 233 and finally output to the optical fiber 232 through the waveguide 204 in a state of the wavelength multiplexed light. The levels of all signal lights are thus equalized.

Since the multi-channel variable optical attenuator 210, the AWG de-multiplexer 220 and the AWG multiplexer 230 are formed in the same substrate 200, this device is suitable for the repeater application, in which the incident wavelength multiplexed light is de-multiplexed, equalized in the level of signal lights, multiplexed and transmitted to the next repeater or the receiving station.

From the invention thus described, it will be obvious that the embodiments may be varied in many ways. Such variations are not to be regarded as a departure form the spirit and scope of the invention, and all such modifications as would be obvious to one skilled in the art are intended for inclusion within the scope of the following claims.

What is claimed is:

1. A multi-channel variable optical attenuator for a wavelength multiplexed light, which contains a plurality of signal lights each having a specific wavelength, said attenuator comprising:

a master control circuitry for detecting a wavelength dependence of the wavelength multiplexed light and outputting a single master control signal corresponding to the wavelength dependence;

a plurality of optical waveguides, the signal lights being transmitted in the corresponding waveguides, respectively;

a plurality of attenuation adjusting portions provided in the respective waveguides, the attenuation adjusting portions attenuating the signal lights transmitted therethrough; and a control circuitry for controlling an attenuation amount of the respective signal lights, based on said single master control signal, by a predetermined rate specific to the respective adjusting portions.

2. A multi-channel variable optical attenuator according to claim 1, wherein the optical attenuating portions include Mach-Zender interferometers having a pair of optical waveguides, at least one of the optical waveguides provided with a phase adjusting portion for varying a phase of the signal light transmitted therethrough, and the control circuitry controls the attenuation amount of the signal light by outputting a control signal to the phase adjusting portion.

3. A multi-channel variable optical attenuator according to claim 2, wherein the Mach-Zender interferometers provided in the respective waveguides have different configurations, and the control signal output from the control circuitry is single and commonly applied to Mach-Zender interferometers so as to attenuate respective signal lights by the predetermined rate.

4. A multi-channel variable optical attenuator according to claim 2, wherein the Mach-Zender interferometers provided in the respective waveguides have the same configuration, and the control signal output from the control circuitry is different to respective phase adjusting portions so as to attenuate respective signal lights by the predetermined rate.

5. A multi-channel variable optical attenuator according to claim 2, wherein the phase adjusting portion in the Mach-Zender interferometer includes a temperature varying device, the phase of the signal light transmitted therethrough being varied by temperature.

6. A multi-channel variable optical attenuator according to claim 2, wherein the phase adjusting portion in the Mach-Zender interferometer includes at least an electrode for applying an electric field, the phase of the signal light transmitted therethrough being varied by the electric field.

7. A multi-channel variable optical attenuator according to claim 1, further comprising:

an arrayed waveguide grating provided in a preceding section of the attenuation adjusting portions, wherein the wavelength multiplexed light is inputted to the arrayed waveguide grating and the signal lights each having different wavelengths are output from the arrayed waveguide grating.

8. A multi-channel variable optical attenuator according to claim 1, further comprising:

an arrayed waveguide grating provided in a section following the attenuation adjusting portions, wherein the signal lights are inputted to the arrayed waveguide grating and a wavelength multiplexed light is output from the arrayed waveguide grating.

* * * * *